Sept. 5, 1961 W. G. SWANSEN 2,998,889
SYNCHRONOUS PULSE GENERATOR AND DRIVE
Filed Aug. 5, 1960 2 Sheets-Sheet 1
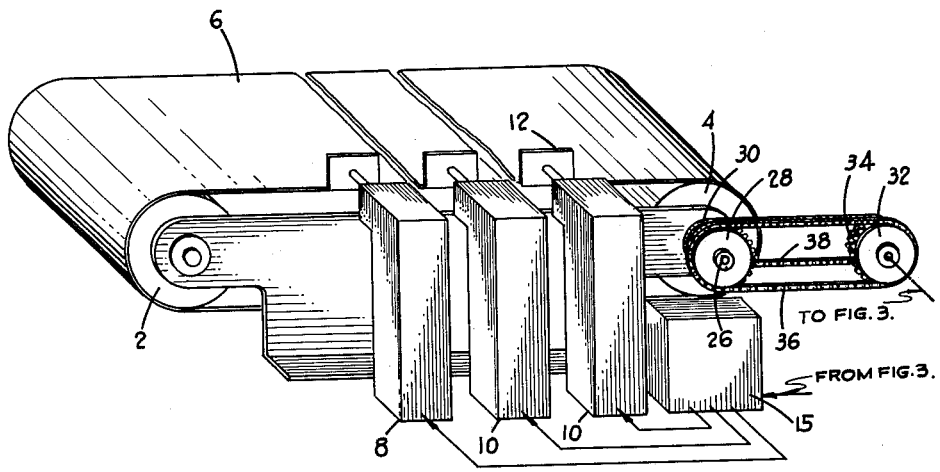
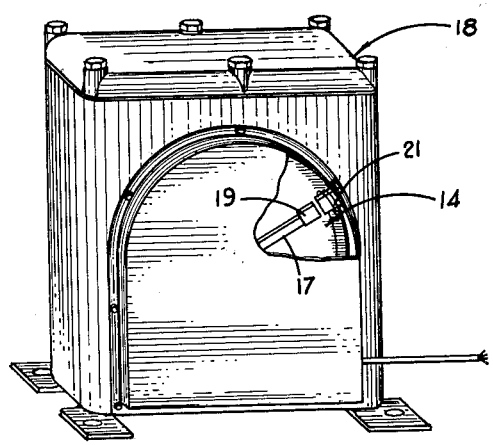
INVENTOR
William G. Swansen
By *[signature]*
Attorney Sept. 5, 1961 W. G. SWANSEN 2,998,889
SYNCHRONOUS PULSE GENERATOR AND DRIVE
Filed Aug. 5, 1960 2 Sheets-Sheet 2

INVENTOR
WILLIAM G. SWANSEN

By *A. G. Douras*
ATTORNEY

United States Patent Office 2,998,889
Patented Sept. 5, 1961

2,998,889
SYNCHRONOUS PULSE GENERATOR
AND DRIVE
William G. Swansen, Westchester, Ill., assignor to Stewart-Warner Corporation, Chicago, Ill., a corporation of Virginia
Filed Aug. 5, 1960, Ser. No. 47,761
9 Claims. (Cl. 214—11)

This application relates to an improved variable speed drive assembly for a pulse generator in a conveyor control system.

The popularity of electronically controlled conveyor systems gave rise to a serious timing problem. In these systems, control pulses must be produced in synchronism with the movement of a conveyor belt upon which packages are transported. In many of these systems, automatic loading devices are provided whereby packages are automatically loaded at predetermined spaced positions on the belt. Devices are also provided for automatically removing the packages from the belt when the packages reach predetermined locations along the path traversed by the belt. These transfer devices are controlled by electrical pulses which are produced at timed intervals in synchronism with the movement of the belt.

The timing of these pulses will have errors introduced during extended periods of use. The belt is carried between two remote rotating pulleys. The pulleys therefore have an angular speed which is a function of the lineal speed of the belt. One of these pulleys is often used as a means for driving the generator for producing the control pulses. The angular speed of the pulley in relation to the speed of the belt at any given time is fixed assuming there is no slip.

However, over a period of time, a very small amount of wear on the periphery of the pulley causes a reduction in its effective diameter. This changes the relationship of the pulley and belt speeds. In addition, the relationship between the speed of the belt and pulley is changed in the event that one or both are replaced.

The pulse generator will vary the interval between pulses as a result of the changing relationships between the belt speed and the pulley speed. This change over a short period of time is very minute. However, the errors introduced over a period of time are cumulative. As a result, the total error is significant within a period of time in the order of a few weeks to a month.

Such an error cannot be tolerated in the control system since the pulse which initiates the operation of a loading or transfer mechanism must be accurately timed in relation to predetermined closely spaced positions on the belt, which positions are allotted to succeeding packages being transported.

As a result of this situation, it has been common in commercial installations to completely reset the timing means by any temporary arrangement which is available. In one case, adhesives were applied to the periphery of the pulley increasing its effective diameter to bring the pulses back into the desired synchronous relationship. None of the known expedients which were utilized was more than temporary and none was satisfactory.

Accordingly it is a primary object of the present invention to provide an improved means for conveniently and accurately maintaining electrical control pulses in timed relationship with the movement of a conveyor belt.

A more specific object is the provision of an improved speed changing device interposed between the pulley and the pulse generator which permits simplicity of pulse generator speed changes in relation to pulley speed. In the preferred embodiment this is accomplished by means of a vernier speed changing device which has its output connected to the pulse generator and which has two inputs both driven from the pulley. The one input drives the output at approximately .9804 times its input speed. The other or vernier input which is in the nature of a sun and planetary gear arrangement drives the output and an increment in the order of .0153 times its input speed. In the initial installation the two inputs speed are preferably the same, for example one revolution per second (1 r.p.s.). The output speed is the sum of the two speeds or .9957 r.p.s.

Thus a substantial increase in the vernier input speed will result in only a very small change in the output speed. This incremental change is very exact. If we now drive the vernier input from the pulley by means of a sprocket secured to the pulley shaft and a chain connected to the sprocket and to a vernier gear on the vernier input, we can use a replaceable group of sprockets, which differ from one another by one tooth for correcting timing errors. Although the change in speed of the vernier input caused by one tooth change in the sprocket is very substantial, nevertheless the change in the output speed of the vernier speed changer is relatively small. These small changes can be used for varying the speed of the pulse generator to compensate for changes in the pulley speed.

It is another object of the present invention to provide a simple, accurate vernier speed changer.

Other objects and the many features of the present invention will be appreciated upon a perusal of the following description taken in conjunction with the accompanying drawings in which:

FIG. 1 is a diagrammatic view of a conveyor system utilizing the teachings of the present invention;

FIG. 3 is a perspective view of the pulse generator.

Figure 2:
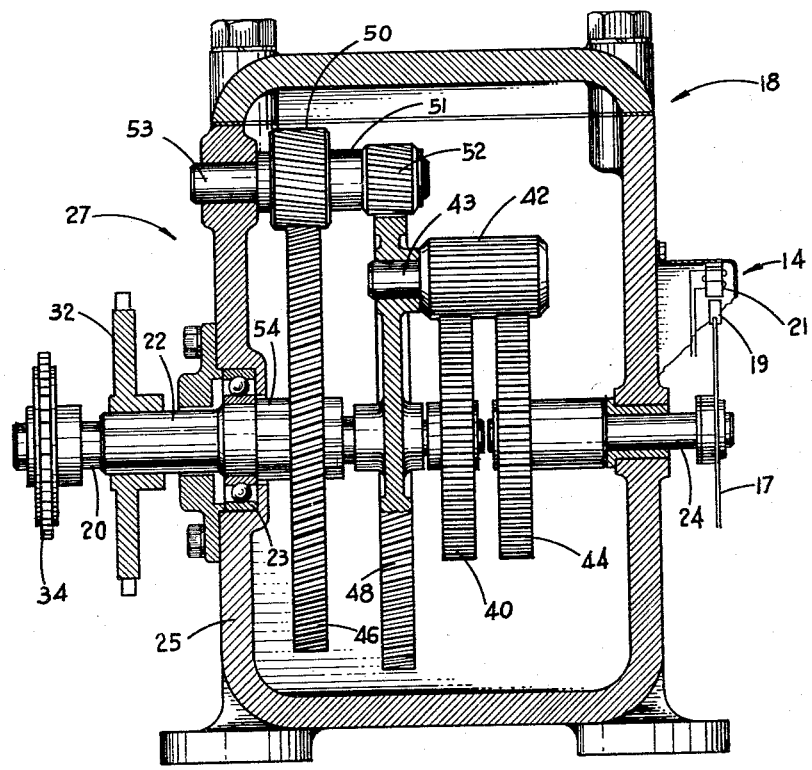
FIG. 2 is a side elevation view of the improved vernier speed changer incorporating the features of the present invention.

A typical conveyor system comprises a pair of spaced cylindrical pulleys 2 and 4 and a belt 6 carried by the pulleys. One of the pulleys may conveniently be connected to a prime mover (not shown), whereby the belt is moved along a path extending between the pulleys. A plurality of loading mechanisms, such as 8, and transfer mechanisms, such as 10, are located at spaced positions along the upper portion of the belt. Each of these mechanisms includes a paddle 12 which is moved across the belt to load packages on and discharge packages from the belt.

The timing of these loading and transfer devices must be controlled very accurately in relation to the movement of the belt. In a typical installation the belt will be moving at speeds as high as 300 feet per minute. Packages will be spaced on centers in the order of 5 feet apart. The paddle associated with each loading and transfer mechanism must move across the belt to load or unload a package and retract prior to the leading edge of the succeeding package moving into the path of the paddle. The initiation of the paddle movement must therefore be controlled with extreme accuracy.

The pulley 4 drives a pulse generator 14. Assuming that no error is introduced the rotation of the pulley 4 will be a direct function of the lineal movement of the belt. The pulse generator is rotated by the pulley 4 at a speed such that pulses are produced in timed relation to the movement of the belt, for example, in the order of 10 pulses per second. Electronic equipment 15 utilizes the pulses to actuate the mechanisms 8 and 10 in a well known manner.

The pulse generator may be of any well known construction. For example, it may consist of a rotating arm 17 carrying a permanent magnet 19 near the outer end thereof. Ten circumferentially spaced electromagnetic coils 21 are positioned adjacent the path of the magnet. As the magnet passes each coil, a pulse is produced in the coil. Assuming that the arm makes one revolution per second, the coils of the generator produce ten equally spaced pulses per second.

As indicated earlier, the errors introduced by wear on the pulley must be compensated for. The improved vernier drive 18 of the present application is provided for this purpose.

The vernier drive comprises a main input shaft 20, a vernier input shaft 22 and an output shaft 24. The vernier input shaft is in the form of a sleeve rotatably mounted by a bearing 23 in the side wall 25 of a generally rectangular housing 27. The main input shaft is rotatably carried within and coaxial with the vernier shaft.

The pulley 4 is fixed on a rotatable shaft 26. A pair of sprockets 28 and 30 are also fixed to the shaft for rotation with the pulley. A chain 36 connects the sprocket 28 with a vernier input gear 32 which is secured to the vernier input shaft. A chain 38 connects the sprocket 30 to a main input gear 34 which is secured to the main input shaft.

The main input shaft 20 drives the output shaft 24 by way of a gear 40 secured to the main input shaft, a planetary gear 42 and a gear 44 secured to the output shaft. In the preferred embodiment, the gear 40 has fifty teeth and the gear 44 has fifty-one teeth. As a result each revolution of gear 40 produces 50/51 revolution of gear 44.

A pair of axially spaced gears 46 and 48 are rotatably mounted on the input shaft and mesh with gears 50 and 52. The gears 50 and 52 are carried on a common hub 51 which is rotatably carried by a shaft 53 fixed to the side wall 25. The gear 46 has a hub portion 54 which is pressed on the vernier input shaft 22 for rotation therewith. In the preferred embodiment, the gear 46 is provided with eighty-one teeth, the gear 50 with twenty-three teeth, the gear 52 with nineteen teeth, and the gear 48 with eighty-five teeth. The shaft 22 therefore rotates the gear 48 at a reduced speed in the order of 1/1.27 times the vernier input speed.

The planetary gear 42 is rotatably mounted on a shaft 43 which is pressed into an aperture in the gear 48 in radially spaced relation to the gear axis. Assuming that the gear 40 is stationary, one revolution of the gear 48 will cause the gear 42 to make one revolutoin around gear 40, thereby to count fifty teeth on the gear 44. Since the axis of the gear 42 also makes one complete revolution around gear 44 which has fifty-one teeth, it will cause the gear 44 to rotate 1/51 revolution. Thus the total reduction from the vernier input to the output is 1/51 times 1/1.27 or 1/64.8.

The direction of rotation of the main and vernier input shafts is such that the vernier change produces a change which is additive with the output speed caused by the main drive. Thus in the preferred embodiment the output speed will be 50/51 plus 1/64.8 or .9957 revolutions per second assuming that both the main and vernier input speeds are one revolution per second.

With a typical change in vernier input speed, for example, 1/20 revolution per second, the output speed will be changed 1/20 times 1/64.8 or .00077 revolutions per second. This change may be plus or minus.

This change in vernier input speed is conveniently provided by changing the number of teeth on the sprocket 28 Thus increasing the number of teeth on the sprocket 28 will increase the vernier input speed and therefore the output speed. Similarly a reduction in the number of teeth in the sprocket 28 will reduce the vernier input speed and reduce the output speed.

The important advantage of this system is the ease with which the changes may be made by merely replacing one sprocket wheel. The sprocket wheel will be readily accessible. The other important advantage is the use of conventional sprocket wheels with a small number of teeth, for example, 20, 21, 22, etc. to produce very minute changes in speed of the pulse generator. For example, in the example given above, a change in sprocket teeth from 20 to 21 caused a corresponding increase in speed in the output of the drive of .00077 revolutions per second.

The readjustment of the timing for operation of the loading and transfer mechanisms is made in the following manner. It will be remembered that in a typical system a series of ten pulses are produced each second. Each of the transfer mechanisms is controlled by one of the ten pulses depending upon its precise position along the conveyor path. For example, if the belt moves at 300' per minute or 5' per second, each series of pulses represents 5' of belt movement. If the first and last transfer mechanisms are 60' apart, a multiple of the 5 foot per second movement, both mechanisms are operated by the same pulse in the series. Similarly, a mechanism 7½' from the first mechanism is operated by the fifth pulse following that which operates the first mechanism. In this manner, all mechanisms are controlled to move across the passing belt sections in the same exact positions if the timing is accurate.

The equipment 15 is adjusted arbitrarily for operation of the first and last transfer mechanisms at times which will result in movement of both mechanisms across the same exact section of the belt if the timing of the pulses is accurate. The conveyor system is then started. Each paddle produces a mark on the belt, for example by securing a wetted paint brush to the lower edge of the paddle. If the timing is inaccurate, the two marks on the belt will be spaced from each other a distance proportional to the inaccuracy.

Assume that the spacing between the marks is due to wear which has reduced the diameter of the pulley. The pulley speed will be too high in relation to the belt speed. This results in an excessive speed in the pulse generator. To compensate for this excessive speed, the conveyor is stopped; and the sprocket 28 is replaced with another sprocket having one less tooth. This will cause the pulse generator speed to be reduced.

The conveyor is again started, and the first and last transfer mechanisms are operated. The paddles on the transfer mechanisms will again leave marks on the belt. If the two marks coincide with each other, the timing of the pulse generator in relation to the belt movement is correct.

However if the marks produced by the paddles on the first and last transfer mechanisms are still spaced (though closer to each other) the sprocket wheel 28 will again be replaced with one having fewer teeth. This procedure will be continued until the marks applied to the belt by the paddles coincide with each other to indicate proper timing. When the timing is so corrected by use of the first and last transfer mechanisms, the correction is also effective for all other loading and transfer mechanisms which are actuated by any one of the ten pulses in each series.

While there has been described what is believed to be the preferred embodiment of the invention, it will be appreciated that various changes and modifications may be made therein; and it is contemplated to cover in the appended claims all such changes and modifications as fall within the true spirit and scope of the invention.

What is claimed is:

1. In a conveyor system of the type in which a pulley-supported endless belt transports packages from a load station to one of a plurality of discharge stations, in which transfer mechanisms remove the packages from the belt at the discharge station and in which means including a pulse generator driven by the pulley selectively actuates the transfer mechanisms in timed relation with movement of the packages on the belt, in combination therewith a speed changing device interposed between the pulley and generator comprising a first gear train connected between the pulley and generator to drive the latter, and a second gear train connected between the pulley and a portion of the first gear train changing the speed at which the first gear train drives the generator by a relatively low value, whereby substantial changes in the speed of the second gear train effect relatively small changes in the generator speed.

2. In a conveyor system of the type in which a pulley-supported endless belt transports packages from a load station to one of a plurality of discharge stations, in which transfer mechanisms remove the packages from the belt at the discharge station and in which means including a pulse generator driven by the pulley selectively actuates the transfer mechanisms in timed relation with movement of the packages on the belt, in combination therewith a speed changing device interposed between the pulley and generator comprising a main input shaft connected to and driven by the pulley, an output shaft connected to and driving the generator, first and second gears on the input and output shafts respectively and having teeth which differ in number, a planetary gear assembly meshing with the first and second gears, means mounting the planetary gear assembly for rotatable movement about its axis and for orbital movement about the first and second gears, and means including an interchangeable gear connecting the planetary gear to the pulley, whereby changes in the number of teeth in the interchangeable gear effecting substantial changes in the orbital speed of the planetary gear assembly effect small incremental changes in the output shaft speed to compensate for variations in the relative speed between the belt and pulley.

3. In a conveyor system of the type in which a pulley-supported endless belt transports packages from a load station to one of a plurality of discharge stations, in which transfer mechanisms remove the packages from the belt at the discharge station and in which means including a pulse generator driven by the pulley selectively actuates the transfer mechanisms in timed relation with movement of the packages on the belt, in combination therewith a speed changing device interposed between the pulley and generator comprising a main input shaft connected to and driven by the pulley, an output shaft connected to and driving the generator, first and second gears on the input and output shafts respectively and having teeth which differ in number by one, a planetary gear meshing with the first and second gears, a fourth gear mounting the planetary gear for rotatable movement about its axis and for orbital movement about the first and second gears, and means including an interchangeable gear connectnig the fourth gear to the pulley to effect small incremental changes in the output shaft speed by substituting interchangeable gears having differing numbers of teeth to compensate for variations in the relative speed between the belt and pulley.

4. In a conveyor system of the type in which a pulley-supported endless belt transports packages from a load station to one of a plurality of discharge stations, in which transfer mechanisms remove the packages from the belt at the discharge station and in which means including a pulse generator driven by the pulley selectively actuates the transfer mechanisms in timed relation with movement of the packages on the belt, in combination therewith a speed changing device interposed between the pulley and generator comprising a main input shaft connected to and driven by the pulley, an output shaft connected to and driving the generator, first and second gears on the input and output shafts respectively and having teeth which differ in number a small amount, a planetary gear assembly meshing with the first and second gears, means mounting the planetary gear assembly for rotatable movement about its axis and for orbital movement about the first and second gears, and means including an interchangeable gear connecting the planetary gear to the pulley, whereby changes in the number of teeth in the interchangeable gear effect small incremental changes in the output shaft speed to compensate for variations in the relative speed between the belt and pulley.

5. In a conveyor system of the type in which a pulley-supported endless belt transports packages from a load station to one of a plurality of discharge stations, in which transfer mechanisms remove the packages from the belt at the discharge station and in which means including a pulse generator driven by the pulley selectively actuates the transfer mechanisms in timed relation with movement of the packages on the belt, in combination therewith a speed changing device interposed between the pulley and generator compring a main input shaft connected to and driven by the pulley, an output shaft connected to and driving the generator, first and second gears on the input and output shafts respectively and having teeth which differ in number by one, a planetary gear meshing with the first and second gears, means mounting the planetary gear for rotatable movement about its axis and for orbital movement about the first and second gears, and means including an interchangeable gear connecting the pulley to the planetary gear to drive the latter, whereby changes in the number of teeth in the interchangeable gear effect small incremental changes in the output shaft speed to compensate for variations in the relative speed between the belt and pulley.

6. In a conveyor system of the type in which a pulley-supported endless belt transports packages from a load station to one of a plurality of discharge stations, in which transfer mechanisms remove the packages from the belt at the discharge station and in which means including a pulse generator driven by the pulley selectively actuates the transfer mechanisms in timed relation with movement of the packages on the belt, in combination therewith a speed changing device interposed between the pulley and generator comprising a main input shaft connected to and driven by the pulley, an output shaft connected to and driving the generator, first and second gears on the input and output shafts respectively and having teeth which differ in number by one, a planetary gear meshing with the first and second gears, a fourth gear mounting the planetary gear for rotatable movement about its axis and for orbital movement about the first and second gears, a second input shaft, a gear train connecting the second input shaft to the fourth gear to drive the latter, and means including an interchangeable gear connecting the pulley to the second input shaft for driving the latter at approximately the speed of the main input shaft, whereby changes in the number of teeth in the interchangeable gear effect small incremental changes in the output shaft speed to compensate for variations in the relative speed between the belt and pulley.

7. In a synchronous pulse generator drive for a conveyor system having a pulley-supported endless belt and pulse controlled mechanisms transferring packages to and from the belt, a speed changer assembly comprising a pair of input shafts and an output shaft, each of the input shafts adapted to be driven by the pulley, and the output shaft adapted to drive the pulse generator, a first and second gears having a differing number of teeth carried by one input shaft and the output shaft respectively, a planetary gear meshing with the gears for a direct input to output drive, means mounting the planetary gear for rotation on its axis and for circumferential movement in a path about the peripheries of the first and second gears, and a gear train connecting the other input shaft and the planetary gear to move the planetary gear in its path for driving the output gear at a low speed in relation to the direct drive speed, whereby substantial changes in the speed of the other input shaft varies the output speed a relatively small predetermined amount.

8. In a synchronous pulse generator drive for a conveyor system having a pulley-supported endless belt and pulse controlled mechanisms transferring packages to and from the belt, a speed changer assembly comprising a pair of input shafts and an output shaft, each of the input shafts adapted to be driven by the pulley and the output shaft adapted to drive the pulse generator, a first and second gears having approximately but not exactly the same number of teeth carried by one input shaft and the output shaft respectively, a planetary gear meshing with the gears for a direct input to output drive ratio close to 1:1, means mounting the planetary gear for rotation on its axis and for circumferential movement in a path about the peripheries of the first and second gears, and a gear train connecting the other input shaft and the planetary gear to move the planetary gear in its path for driving the output gear at a low speed in relation to the direct drive speed, whereby substantial changes in the speed of the other input shaft varies the output speed a relatively small predetermined amount.

9. In a synchronous pulse generator drive for a conveyor system having a pulley-supported endless belt and pulse controlled mechanisms transferring packages to and from the belt, a speed changer assembly comprising a pair of input shafts and an output shaft each of the input shafts adapted to be driven by the pulley and the output shaft adapted to drive the pulse generator, a first and second gears having approximately but not exactly the same number of teeth carried by one input shaft and the output shaft respectively, a planetary gear meshing with the gears for a direct input to output drive ratio close to 1:1, a fourth gear mounting the planetary gear for rotation on its axis and for circumferential movement in a path about the peripheries of the first and second gears, and a gear reducing train connecting the other input shaft and the fourth gear to move the planetary gear in its path for driving the output gear at a low speed in relation to the direct drive speed, whereby substantial changes in the speed of the other input shaft varies the output speed a relatively small predetermined amount.

References Cited in the file of this patent

UNITED STATES PATENTS 1,740,788     Sheridan _____ Dec. 24, 1929